United States Patent
Truong Dinh et al.

(10) Patent No.: US 6,933,341 B2
(45) Date of Patent: Aug. 23, 2005

(54) THERMAL INSULATION GEL WITH CONTROLLED CROSSLINKING FOR PETROLEUM HYDROCARBON TRANSMISSION LINES

(75) Inventors: Nguyen Truong Dinh, Chasse sur Rhone (FR); Jean-Marc Basset, Chasse sur Rhone (FR); Stéphane Ruelle, Chasse sur Rhone (FR); Angèle Chomard, Paris (FR)

(73) Assignees: Saipem S.A., Montigny-le-Bretonneux (FR); Institut Francais du Petrole, Rueil-Malmaison (FR); Condat SA, Chasse sur Rhone (FR)

(*) Notice: Subject to any disclaimer, the term of this patent is extended or adjusted under 35 U.S.C. 154(b) by 0 days.

(21) Appl. No.: 10/466,936

(22) PCT Filed: Feb. 4, 2002

(86) PCT No.: PCT/FR02/00406
§ 371 (c)(1),
(2), (4) Date: Dec. 18, 2003

(87) PCT Pub. No.: WO02/062874
PCT Pub. Date: Aug. 15, 2002

(65) Prior Publication Data
US 2005/0075437 A1 Apr. 7, 2005

(30) Foreign Application Priority Data
Feb. 7, 2001 (FR) .............................. 01 01892

(51) Int. Cl.$^7$ .................................. C08K 5/09

(52) U.S. Cl. .................. 524/775; 524/776; 524/848; 524/871; 525/55; 526/318

(58) Field of Search ......................... 524/848, 775, 524/776, 871; 525/55; 526/318

(56) References Cited

U.S. PATENT DOCUMENTS

| | | | |
|---|---|---|---|
| 4,709,982 A | * 12/1987 | Corne et al. | 385/100 |
| 4,941,773 A | * 7/1990 | Vergouw | 405/157 |
| 5,177,143 A | 1/1993 | Chang | |
| 5,221,534 A | 6/1993 | DesLauriers | |

FOREIGN PATENT DOCUMENTS

| FR | 2405345 | 4/1979 |
|---|---|---|
| GB | 1523958 | 9/1978 |

* cited by examiner

*Primary Examiner*—William K. Cheung
(74) *Attorney, Agent, or Firm*—Antonelli, Terry, Stout & Kraus, LLP

(57) ABSTRACT

The present invention relates to and uses, in order to prevent crude oil from "congealing" in a transportation line, a controlled-crosslinking thermal insulation gel, i.e. relatively fluid at the start and developing in-situ gelation in lines only under certain conditions, temperature conditions among other things. In order to obtain controlled crosslinking, it is possible to carry out 1) Physical crosslinkings, i.e. physical bonds between polymers—completely reversible bonds by thermal effect and/or mechanical shear—and 2) Chemical crosslinkings: monomers or polymers having functions allowing chemical bonds to be established between polymers.

22 Claims, 1 Drawing Sheet

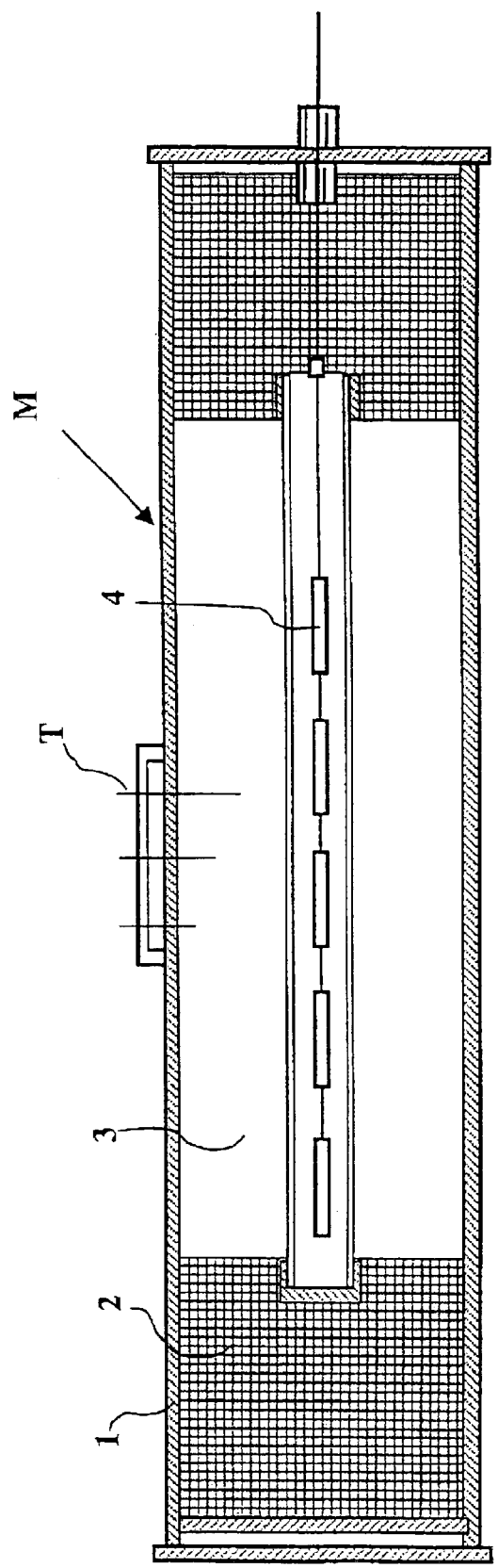

THERMAL INSULATION GEL WITH CONTROLLED CROSSLINKING FOR PETROLEUM HYDROCARBON TRANSMISSION LINES

TECHNICAL FIELD OF THE INVENTION

The present invention relates to the technical field of thermal insulation of oil transportation lines whose operating conditions in production wells are of the order of 60 to 120° C. as regards temperature and about 300 bars as regards pressure; the crude oil is then liquid and pumpable. The pressure and the temperature fall continuously along these lines and congealing of the crude oil is the major drawback.

The application relates more particularly to offshore as well as onshore drilling where the temperatures are very low or even negative.

Technical Problem:

In offshore development, the production well is provided with a production wellhead that rests on the sea bottom. The crude oil then has to be carried to tankers, storage barges or storage and/or pumping platforms, by means of complex systems of risers, pipelines and similar means, referred to hereafter as lines or flowlines.

Under deep and very deep offshore drilling conditions, the environment of the risers is water at 0–10° C., the pressure decreases and the crude therefore congeals because of the deposition of hydrates, paraffin, «black mud», etc.

These lines can be about twenty km long and, in case of production stop due to congealing of the crude, the maintenance and servicing operations are extremely expensive. Congealing of the crude oil therefore has to be prevented in particular.

Current Solutions:

Heating of the lines by means of hot water or resistors

Thermal insulation of the lines with insulating material sheaths such as glass wool, rock wool, insulating foam . . .

The drawbacks are:

difficult to implement 1)

efficiency loss in case of breakage and in the presence of water 2)

high cost 3)

«Pipe in pipe» technique (concentric lines) with the annulus evacuated or filled with a rare gas (argon, xenon . . . ), which are good thermal insulants.

Drawbacks: Points 1)+3)

Syntactic foam: system where hollow glass marbles are embedded in a thermosetting resin matrix as described in patent U.S. Pat. No. 5,575,871 (Takeda Chemical Ind./1999)

Drawbacks: Points 1)+2)+3)

Gel based on ethylene glycol and water.

Prior Art:

1) U.S. Pat. No. 5,290,768 (Merck & Co/1994): Polysaccharide thickener of Welan™ type in ethylene glycol and with EDTA (ethylene diamine tetra-acetic acid) as rust complexing agent.

2) U.S. Pat. No. 5,876,619 (Montsanto/1999): Polysaccharide thickener of scleroglucane type in glycerin and water.

Drawbacks:

sensitive to bacteria pollution sensitive to rust heavy (ballast product).

Gel based on petroleum products (gas oil, kerosine, mineral oils):

1) U.S. Pat. No. 5,177,193 (Ravchem Corp/1993): various polymer gels in a mineral base with chemical crosslinking Drawback: Point 1)

2) U.S. Pat. No. 5,858,489 (Elf Aquitaine Production): Aerogels

Drawback: Point 1) extremely difficult to implement

3) U.S. Pat. Nos. 5,871,034 and 60,092,557 (G. R. Summer 1999 and 2000): Mixture of bitumens with thermoplastic polymers and mineral fillers.

Drawbacks: Point 1) and soft product under high pressure and high temperature.

4) U.S. Pat. No. 4,941,773 (Smit Offshore Contractors, 1990): The base and kerosine thickened by thermosetting resins based on polyols and aldehydes.

Among all these solutions, gels currently represent the most advantageous technique as regards its cost, material selection flexibility and ease of use. They essentially consist of a base and of a thickener:

base: the most thermally insulating possible base is selected, generally petroleum or chemical products or glycol derivatives thickener: used to congeal the base and thus to prevent thermal convection phenomena.

General Drawbacks of the Existing Techniques:

Apart from gels, the solutions are immediately solid insulants that are difficult to use.

The current gels are «pasty» system that are less difficult to use than solid insulants, but they remain difficult and excluded in lines with complex configurations such as bundles. These are tubes attached to one another comprising for example two production tubes and three smaller lines or tubes used to carry other fluids, the assembly being embedded in a common external sheath filled with thermally insulating gels.

Many pressure losses occur during filling of these bundles, without it being possible to use high-pressure pumping means (>100 bars for example) because of the low mechanical strength of the outer walls, and air pockets or air bubbles inevitably appear. This can pose problems of collapse of the external sheath under high pressure (150 bars) under deep sea conditions.

SUMMARY OF THE INVENTION

The present invention relates to and uses, in order to prevent the crude oil from «congealing» in a line, a controlled-crosslinking thermal insulation gel, i.e. a relatively fluid gel in the beginning, gelation occuring in-situ in the lines only under certain conditions, temperature conditions among other things. The gels obtained are mechanically and thermally stable at high and low temperature, and especially in very weakly solvent bases such as pure linear paraffins, pure isoparaffins . . . and also especially with bases of the same type exhibiting phase changes such as crystallization.

DETAILED DESCRIPTION OF THE INVENTION

According to the invention, controlled crosslinking can be obtained by carrying out:

1) Physical crosslinking: i.e. by establishing physical bonds between polymers, notably with the following means:

a) Diblock or triblock sequential polymers: crosslinking nodes by affinity, then phase segregation b) Polymers having functions allowing physical bonds (hydrogen, Van der Waals, dipole-dipole, etc.), for example polar functions such as alcohols, acids, amines, ethers, esters . . . and similar functions, generally functions with heteroatoms of O, N, S, Cl type.

2) Chemical crosslinking: Monomers or polymers having functions allowing to achieve chemical bonds between polymers.

The advantages are as follows:

Ease of use (pumping, setting, complex systems)

Homogeneous gel, without «air bubbles or pockets»

No thermal convection

Stable at high temperature between 80–150° C.

Great durability

Pressure resistant

Thermal insulant

Light gel (density<0.8)

Physical gel: specifications flexibility, i.e. reversible or irreversible, pseudoplastic or thixotropic Products more economical than syntactic foams.

Chemical systems usable according to the invention: the following instances are given by way of non limitative example, and the man skilled in the art can complete them according to his general knowledge and possibly to some routine tests.

1) Bases:

petroleum products: light cuts or others, according to the application considered, such as kerosine, gas oil, cut referred to as petroleum spirit; type 60 (S or NS) mineral bases up to paraffins, bitumens and similar products, petroleum products with transformation: linear paraffins or isoparaffins . . . , hydroisomerized bases, . . . , chemical derivatives of glycol, of monoethylene glycol, monopropylene glycol, diethylene glycol and similar types, water→insulants+ballast, vegetable oils such as rapeseed, sunflower, soybean, palm oil, etc., extracted from seeds, plants, barks, fruit, . . .

synthetic bases such as polyalphaolefins (PAO), polyisobutylenes (PIB), polyalkyleneglycols (PAG), polyinternal olefins (PIO), fatty esters, fatty alcohols, fatty ethers.

Among these bases, 2 categories can be distinguished:

(1) the bases, light (of very low viscosity) or not, which do not crystallize at positive temperatures, (2) the bases that crystallize at positive temperatures.

The latter bases are particularly interesting when this crystallization is exothermic and when this energy is used to compensate for the heat waste at low temperature of the sea bottom. It is well-known that the more linear and the longer the hydrocarbon chains, the more they tend to crystallize at increasingly high temperatures. Examples of linear paraffins are Linpar® 13–14, 14, 14–17, 16–18 type paraffins, fatty esters, fatty alcohols, for example Nacol® 12, 14, 16, 18, 20 or 22 . . . Nafol® 12–14, 12–18, 16–18, or simply mineral bases with a high paraffin content.

These phase-change bases form with conventional thickeners often loose and unstable gels when they are subjected to thermal cycles.

2) Physical Gelling Agent:

a) Diblock or triblock or radial sequential polymers:

Any diblock or triblock or radial sequential polymer. This very particular structure type is mainly obtained by ionic (anionic or cationic) polymerization.

A non-limitative example is the range of products known under the tradename KRATON® and marketed by Shell™.

These products are distinguished by:

the number of sequences (blocks): two or three or radial an elastomeric sequence of polybutadiene or polyisoprene type, as it is (D series) or hydrogenated (G series), a sequence of polystyrene type (which forms the crosslinking phase), the composition (% styrene), the molecular mass, in the case of a triblock or radial polymer, the styrene phases generally «surround» the elastomeric phase.

The mechanical properties of the gel depend on the nature of the base used, the grade of the Kraton™ used, the percentage. According to the desired application, a very «firm», rubbery, extremely resistant and stable towards thermal or mechanical stresses, or a very «loose» gel, on the verge of flowing, reversible, thixotropic and pseudoplastic is obtained.

Standard thickeners of polyisoprene, polybutadiene, natural rubber, polyisobutylene, ethylene-propylene copolymers type are also advantageously associated with these physical gelling agents.

Several Kraton™ grades can also be used together according to the desired performances.

This first category of sequential-structure physical gelling agents whose crosslinking nodes are the phase segregation zones preferably include, by way of non limitative example, the Kraton® products range marketed by Shell™ etc.

The bases preferably used in the following non-limitative examples, as described above, are: a rapeseed methyl ester, a linear paraffin (Linpar $C_{10}$®), «light» cut and «heavy» cut (Linpar C16–C18®), an isoparaffin (Isopar™ M), a standard gas oil, petroleum spirit, etc.

The tests carried out to evaluate the gelation kinetics, the various mechanical properties, the compatibility of the gel with the base, are as follows:

A composition is prepared under the conditions mentioned in the examples hereafter, in a glass bottle provided with a metallic screw cover to obtain a gel or not.

A composition is fluid at the observation temperature if it flows when the bottle is inclined (or tilted at 180°). In the opposite case, a gel is obtained.

The gel time is the time required for a composition to change from the fluid state to the state of gel at the temperature of the experiment.

Mechanical strength test: A steel ball of about 10 g is dropped at a height of about 20 cm above the surface of the gel. The gel is loose if the ball penetrates the gel with or without bounce. In the opposite case, the gel is firm, mechanically stable at the testing temperature.

Test intended to evaluate the compatibility and the thermal stability of the gel with the base under the conditions of a thermal cycle; the gel is subjected to 2 thermal cycles:

(1) Cycle 1: 10 h at 80° C./14 h at 20° C./10 h at 80° C./14 h at 20° C.

(2) Cycle 2: 10 h at 80° C./14 h at 0° C./10 h at 80° C./14 h at 0° C.

At the end of the thermal cycle, the gel must remain firm (no mechanical properties loss) without «releasing» the base, i.e. existence of 2 phases, a liquid phase and a gel phase. This phenomenon is known as syneresis or bleeding.

This phenomenon is particularly marked in bases with phase changes, for example Linpar® $C_{18}$–$C_{20}$, which crystallizes from 30° C. and which, besides the fact that it is a very bad solvent for conventional polar thickeners, separates from the gel once crystallized.

The physical gelling agents selected according to the invention are perfectly stable with these bases, even bases with «phase change».

The range of Kraton® thermoplastic polymers finds applications as additives in adhesives, bitumens, mixtures of thermoplastics, mastics, elastomers, etc.

In the present invention, the Kraton® products described above can be more or less suitable according to the specific needs and to the bases used. The following examples illustrate this feature in a non limitative way:

It is also possible to incorporate one or more mineral fillers in order to optimize the cost of the product, its mechanical or physical properties, to weight it or on the contrary to lighten it. The man skilled in the art knows in these fields fillers such as clays, bentonite, barite, calcium carbonates, and examples of lightening agents are, in particular, glass microballs such as those marketed by the 3M™ company, which are microballs of about 10 to 150 microns, with an average dimension of about 30 microns, and a double function of product lightening and thermal insulation improvement.

The man skilled in the art will be able to envisage all the fillers and filler combinations of this type.

EXAMPLE 1

Comparative Test with a Conventional Thickener

Base=Linear paraffin Linpar® $C_{18}$–$C_{20}$

Gelling agent=Kraton G 1651 E vs. bentone (Thixogel® VP)

Testing temperature=Cycles 1 and 2

The percentages in the examples hereunder are expressed in mass of active substance.

TABLE 1

Characteristics of the gels

| Percentage | Kraton ® G 1651 E | Thixogel ® VP |
|---|---|---|
| 4 | « Firm » gel. No bleeding. Thermal cycle stability | Fluid solution |
| 8 | « Firm » gel. No bleeding. Thermal cycle stability | Fluid solution |
| 10 |  | « Loose » gel. Bleeding. Thermal cycle instability |
| 12 |  | « Loose » gel. No bleeding. Thermal cycle stability |
| 15 |  | « Firm » gel. No bleeding. Thermal cycle stability |

The example given above clearly shows the advantage afforded by physical gelling agents in relation to conventional thickeners for a given base, much lower proportion of material used, higher gel quality and stability.

EXAMPLE 2

Manufacturing Process and Direct Use

TABLE 2

Manufacture and use of the products

|  | Kraton ® G 1651 | Thixogel ® VP |
|---|---|---|
| Manufacture | Dispersion of the powdered polymer at 40° C. if the base has to be melted, or at ambient temperature (20° C.) in the presence or not of other polymers or dispersants Liquid dispersion of « swollen » polymer powders | Manufacture of a bentone-based grease followed by crushing, deaeration Gel having a certain consistency |
| Use in the lines | Filling with the fluid liquid dispersion from the bottom In-situ gelation with temperature (example: at 80° C. gel at 4% gel time = 4 h) or others | Filling by pumping under pressure (150 bars) and « vacuum draining » throughout the line Risk of « air pockets or bubbles » |

This example shows the ease and flexibility of use of a physical gel with in-situ crosslinking and controlled initiation, for example by temperature.

EXAMPLE 3

Product Conditioning Process in Case of no Direct Use

| Bases | Temperature | Composition | Aspect | Pot life |
|---|---|---|---|---|
| Linpar C10 | 20° C. | 8% Kraton G 1651 | Heterogeneous swollen powders dispersion | 3 to 6 months |
| Linpar C10 | 20° C. | 6% Kraton G 1651 2% Kraton G 1702 | Homogeneous dispersion | 3 to 6 months |
| Linpar C18–20 | 40° C.(1) | 8% Kraton G 1651 | Heterogeneous swollen powders dispersion | 3 to 6 months |
| Linpar C18–20 | 40° C.(1) | 6% Kraton G 1651 2% Kraton G 1702 | Homogeneous dispersion | 3 to 6 months |

(1)It is recommended to keep these products or to bring them to a temperature of 40° C. prior to use (crystallization temperature 28° C.).

It appears that, in cases where the product is not directly used from the conditioner, incorporation of another polymer allows the homogeneity, the stability and the pumpability of the product to be improved.

EXAMPLE 4

Effect of the Base, of the Temperature, of the Nature and of the Concentration of the Physical Gelling Agent: Comparative Tests with Conventional Polymeric Thickeners

TABLE 3

Formation conditions of a stable gel at 20 or 80° C.

|  | Linpar ™ C18–20 | Linpar ™ C10 | Gas oil | Isopar ™ M |
|---|---|---|---|---|
| Polyisoprene | Fluid solution any temp. up to 20% | Fluid solution any temp. up to 20% | Fluid solution any temp. up to 20% | Fluid solution any temp. up to 20% |
| Kraton ™ G 1651 | 8% firm gel >= 100° C. | 8% firm gel >= 80° C. | 8% firm gel <= 20° C. | 8% firm gel >= 80° C. |
| Kraton G 1652 | 10% firm gel <= 20° C. | Fluid | Fluid | Not studied |
| Kraton D 1111 | 8% loose gel at 80° C. | Fluid | Fluid | Not studied |
| Kraton D 1101 | Fluid | Fluid | Fluid | Not studied |
| Kraton D 1161 | Fluid | Fluid | Fluid | Not studied |
| Kraton G 1701 | 8% loose gel at 80° C. | 15% loose gel at 80° C. | 8% firm gel at 20° C. | Not studied |
| Kraton G 1654 | 8% firm gel at 100° C. | 8% loose gel at >20° C. | 8% firm gel at 20° C. | Not studied |
| Kraton GRP 6917 | 8% firm gel >= 100° C. | 8% firm gel at 80° C. |  | Not studied |

This example shows that, according to the conditions of the application (temperature, base, etc.), the nature of the suitable physical gelling agent and its concentration can be selected.

As described above, these polymers occur as diblocks or triblocks or radial polymer, preferably as triblocks with ethylene-propylene sequences or butadiene or isoprene, preferably ethylene-propylene with styrene sequences with a styrene composition ranging from 10 to 40%, preferably from 20 to 35%, with weight average molecular weights characterized in the manufacturer's data sheet by high, average and low, preferentially high weight average molecular weight. The percentage of use of these physical gelling agents depends on the bases used, but it generally ranges between 1 and 30%, preferably between 2 and 20%.

EXAMPLE 5

Reversible Gel by Shear and Temperature Effect

Another advantage of these physical gelling agents is that it is possible to reversibly destroy these crosslinking nodes of the three-dimensional network which are the styrene phases by temperature rise and/or mechanical stirring, the latter re-forming as soon as these two effects stop.

TABLE 4

Effect of temperature and stirring: perfect reversibility of the gel

| Initial state | Heating at 130° C. for 1 h | Heating at 130° C. and stirring with a dispersing device at 1500 rpm for 1 h | 2-h rest at 80° C. |
|---|---|---|---|
| Firm gel with 4% Kraton G 1651 in Linpar C18–20 stable at 80° C. | Loose gel | Fluid | Firm and stable gel |

This reversibility is particularly interesting for use in bundles of complex geometry.

EXAMPLE 6

Characteristics of Physical Gels with Kraton® G 1651 (8%)

TABLE 5

Properties of the gels

|  | Linpar $C_{18-20}$ | Linpar $C_{10}$ |
|---|---|---|
| 50° C. density 20° C. | 0.774 | 0.755 |
| Thermal convection (1) | No | No |
| Thermal conduction (2) at 80° C. (W · m$^{-1}$, °K$^{-1}$) | 0.16 | 0.14 |

(1) The thermal conductivity is measured at different angles of rotation; if it is the same everywhere, there is no convection.
(2) ISO 8894-2 b) «Associative» Polymers:

Certain «associative» polymers give great interactions in certain solvents, which result in a thixotropic (variation of the viscosity as a function of time) and pseudoplastic gel.

There is a series of resins which, once dispersed in a solvent, develop highly thixotropic gels. Examples of such resins are ALKYDE, ACRYLIC, URETHANE resins, etc. These resins are extremely complex as regards their formula, and their selection and association require a certain expertise. Without being limitative, the present description will focus on Alkyd resins, which are the most important ones in this application.

These Alkyd resins result from an addition reaction between a polyol and a polyacid. They can be long or short in oil, modified or not, for example with amide, urethane, isocyanate functions.

They are often used in synergy with other resins or polymers of polyurea, polyamide, polyurethane type, etc.

In relation to the above physical gelling agent family, the latter rather represent a «loose», thixotropic and pseudoplastic gel. In the first case, gelation is initiated by the temperature and, in the second case, it occurs practically at the end of the mixing operation and with time.

EXAMPLE 7

Examples of Thixotropic Physical Gels Based on Associative Polymers a) Petroleum Spirit Base:

| | |
|---|---|
| Alkyd resin Lixol ™ | 27% |
| Resin Super Gelkyd ™ 391W | 30% |
| Dowanol ™ PM | 1.5% |
| Petroleum spirit | 41.5% | b) Linpar $C_{10}$™ Base:

The petroleum spirit of example a) is replaced by Linpar $C_{10}$.

c) Gas Oil Base:

The petroleum spirit of example a) is replaced by gas oil.

d) Rapeseed Methyl Ester Base:

The petroleum spirit of example a) is replaced by rapeseed methyl ester.

These gels are prepared according to a protocol determined by each manufacturer's expertise.

All these gels are «loose» gels, perfectly thixotropic and pseudoplastic. The ease of use is the same as for physical gels: the compositions are fluid under heavy mechanical stirring (or at a temperature>40° C.) and gelation occurs at rest with time inside the flow lines.

The gels are stable towards the thermal cycles and in time.

The gel based on petroleum spirit was evaluated as regards thermal convection; no thermal convection and no thermal conductivity could be observed: $\lambda=0.14$ $W.m^{-1}$, $°K^{-1}$.

The general compositions of these physical gels based on associative polymers are between 10–40% alkyd resin, preferably about 35%, possibly with a polar solvent derived from glycol between 0.5 and 10%, preferably 1 to 3%, the rest consisting of the base.

Physical gels are particularly easy to use:

The polymer(s) are dispersed in the selected base the reaction does not start.

According to the application, the temperature and/or stirring is used to completely solubilize the macromolecular chains: the reaction starts.

According to products, gelation (congealing) is more or less fast and occurs with time through physical bonds or segregation phases.

According to the application requirements, a «loose», mechanically reversible physical gel may be preferred, i.e. a pseudoplastic and thixotropic gel (fluid through shearing), which becomes thermally fluid (fluid through temperature increase).

3) Chemical Gelling Agent:

In the case of a chemical gelling agent, two mechanisms can be considered:

a) the initial mixture is a mixture of reactive monomers which, under the effect of radical initiators or not, will initiate the polymerization (or polyaddition) or crosslinking (polyfunctional monomers) reaction in the presence or not of catalysts, under predetermined temperature and stirring conditions.

b) the initial mixture is a mixture of polymers having reactive functions that react with each other or by means of a monofunctional or polyfunctional monomer. The latter plays the same crosslinking agent role as in the first case. This reaction can also start with radical initiators or not, in the presence or not of catalysts and under predetermined temperature and stirring conditions.

In the first case, the following non limitative examples can be mentioned:

polymerization (radical crosslinking): the monomers have an unsaturated bond (double bond) which, under the effect of a radical initiator, will start the reaction. Examples of monomers are alkyl methacrylate or alkyl acrylate monomers, vinyl esters, vinyl chlorides, etc.; examples of polyfunctional monomers are a neopentylglycol dimethacrylate or divinylbenzene; examples of radical initiators are peroxides (for example benzoyl peroxide) or diazoic compounds (for example AIBN: 2,2'azobisisobutyronitrile);

polyaddition (or polycondensation) reaction: polyurethanes (the polyols reacting with the polyisocyanates), polyureas (the polyamines reacting with the polyisocyanates), polyesters (the polyacids with the polyalcohols), polyamides (the polyamines with the polyacids), thermosetting resins of epoxy resin type, polyimides, etc.

The reactive monomers and the compounds necessary to the reaction are mixed in the selected base and the crosslinking polymerization reaction is generally initiated by a temperature increase. The gel time must be controlled according to the implementation process.

In the second case, the following non limitative examples can be mentioned:

polymers soluble in the selected base having reaction functions or double bonds capable of crosslinking the polymers with each other. Examples thereof are polyisoprenes, hydrogenated or not, polybutadienes, hydrogenated or not, ethylene-propylene-diene monomers (EPDM), styrene-butadiene rubbers (SBR), functionalized polyisobutylenes (with an anhydride, carboxylic or amine function for example), and more preferably esters referred to as alkyd resins, resulting for example from an addition between a polyol and unsaturated fatty acids.

In the case of radical crosslinking, initiators such as peroxide type initiators, for example benzoyl peroxide, etc., or nitrogen-containing, for example 2,2'azobisisobutyronitrile, with or without difunctional monomers of neopentylglycol dimethacrylate or divinylbenzene type are suitable.

The gel time must also be controlled according to the process requirements.

EXAMPLE 8

Chemical Gel

| | |
|---|---|
| Alkyd resin Lixol | 20% |
| Synolac 6883 | 20% |
| Coporob 2526 | 20% |
| BYK 411 | 1% |
| Monomers and crosslinking agents | 2% |
| Radical initiators | 1% |
| Catalysts | 0.8% |
| Linpar C10 | 35.2% |

The composition gives a firm gel after about 4 h at 80° C.

The example is given only by way of illustration of the concept of chemical gel in this application.

The advantages that all these chemical systems of the invention have in common are:

- a compound that can be fluid to relatively viscous, but perfectly pumpable and posing no filling problems in lines of complex geometry and configuration such as bundles, or air pocket or aeration problems if the compound is too «consistent»,
- gelation of the system starts either very progressively in time, or it is initiated by an external factor (temperature, energy supply),
- the gel is thermally perfectly stable from 0° C. to 100° C., resistant to biological pollution and stable in time,
- according to needs, the gel is perfectly compact, supple and pressure-resistant,
- for certain bases with crystallization between 0 and 50° C., the gel remains always stable towards thermal cycles between 0 and 100° C.,
- the gels are totally incompatible with sea water, they cannot «fade», with a density < or =0.8 and therefore relatively easy to recover in case of an accident. Under certain conditions, these gels can be non toxic to the marine environment and to man (vegetable oils, esters, 100% linear paraffin or isoparaffin base).

DESCRIPTION OF THE DRAWINGS 1.1 Description of the Measuring Model:

(the measuring model is shown in the accompanying sole FIGURE)

The models consist of a 27-mm diameter and 50-cm long steel hub (M) (L>>d so as to limit edge effects) filled with oil maintained at constant temperature by a direct current-fed heater band.

This steel tube is arranged in a 100-mm diameter Plexiglas™ tube (1) and kept in position by means of polystyrene insulating centering plugs (2). The cavity (3) thus formed is filled with INSULATING GEL in the most homogeneous way possible. Heating resistors (4) are arranged in the centre.

The assembly is immersed in a container comprising water maintained at 30° C. by an immersion heater.

The models are equipped with 6 thermocouples T:
- 1 on the steel wall
- 1 on the Plexiglas™ wall,
- 4 in the paraffin layer at various depths.

They all have the same angular position.

The object of the measurement is:
- to check the absence of thermal convection by measuring the temperature field which must remain constant in the three different angular positions 0, 90 and 180°,
- to have an average thermal conductivity of the insulant.

This model was filled with a gel based on conventional bentonite in Linpar C18–20 in comparison with a loose gel based on associative polymers:

In the first case, a particular assembly is used:
- Conditioner heated and stirred at 80° C./1 h. Placed under vacuum for «dearation» purposes.
- Device connecting the conditioner to the model with vacuum downstream and pressure upstream from the conditioner, with a feed pump to prevent air pockets or bubbles.

In the second case, it is sufficient to mechanically shear the gel based on petroleum spirit which becomes fluid, to feed the model, to place under vacuum for dearation and to let the gel recover its consistency at ambient temperature after about 4 hours.

The results obtained are as follows:

| | Gel: 15% Bentone in Linpar C18–20 (Ex. 1) | Gel: petroleum spirit (Ex. 6) |
|---|---|---|
| Thermal loss (W/°K*m2) | 8.19 | 9.01 |
| Thermal field | Constant | Constant |
| At different angles | (<1/10°) | (<1/10°) |
| Thermal conductivity (W/m*°K) | 0.174 | 0.147/0.141/0.134 |

It can be seen that these are very good thermal insulants where thermal convection phenomena are entirely blocked even in the case of loose gels in petroleum spirit.

What is claimed is:

1. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, and in that the product is crosslinked by chemical bonds between an initial mixture of monomers or polymers.

2. A product as claimed in claim 1, characterized in that the initial mixture is a mixture of polymers having reactive functions which will react with each other or by means of a monofunctional or polyfunctional monomer under predetermined temperature and stirring conditions.

3. A product as claimed in claim 2, characterized in that the polymers are soluble in the selected base and exhibit reaction functions or double bonds capable of crosslinking the polymers together, the polymers being selected from the group consisting of polyisoprenes, hydrogenated or not, polybutadienes, hydrogenated or not, ethylene-propylene-diene monomers (EPDM), styrene-butadiene rubbers (SBR), functionalized polyisobutylenes with an anhydride, carboxylic or amine function and alkyd resins.

4. A product as claimed in claim 3, characterized in that the initial mixture further comprises an initiator.

5. A product as claimed in claim 3, characterized in that the initiator is selected from the group consisting of benzoyl peroxide, 2,2'azobisisbutyronitrile.

6. A product as claimed in claim 5, characterized in that the initiator further comprises difunctional monomers of neopentylglycol dimethacrylate or divinylbenzene.

7. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, in that the thermal insulation gel comprises, for the preparation thereof, a gelling agent and at least one base selected from the group consisting of petroleum products, petroleum products with transformation, chemical derivatives of, glycols, water based insulants+ ballast, and vegetable oils and synthetic bases, in that the gelling agent is a physical gelling agent comprising one or more diblock or triblock or radial sequential polymers, and in that the product further comprises polyisoprene, polybutadiene, natural rubber, polyisobutylene, or ethylene-propylene copolymers as thickeners associated with the physical gelling agents.

8. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line in that the thermal insulation gel comprises, for the preparation thereof, a gelling agent and at least one base selected from the group consisting of petroleum products, petroleum products with transformation, chemical derivatives of, glycols, water based insulants+ballast, and vegetable oils and synthetic bases, in that the gelling agent is a physical gelling agent comprising one or more diblock or triblock or radial sequential polymers, and in that further physical gelling agents are associated with the physical gelling agents in order to improve the homogeneity, stability and pumpability of the product in cases where there is no direct use of the product.

9. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, in that the thermal insulation gel comprises, for the preparation thereof, a gelling agent and at least one base selected from the group consisting of petroleum products, petroleum products with transformation, chemical derivatives of, glycols, water based insulants+ballast, and vegetable oils and synthetic bases, and in that the base is selected from the group consisting of a rapeseed methyl ester, a linear paraffin, an isoparaffin, a standard gas oil, and petroleum spirit.

10. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, in that the thermal insulation gel comprises, for the preparation thereof, a gelling agent and at least one base selected from the group consisting of petroleum products, petroleum products with transformation, chemical derivatives of, glycols, water based insulants+ballast, and vegetable oils and synthetic bases, in that said gelling agent is physical gelling agent comprising a triblock sequential polymer with ethylene-propylene sequences and styrene sequences with a styrene composition ranging from 10 to 40%.

11. A product as claimed in claim 10, characterized in that the percentage of use of physical gelling agents ranges between 1 and 30%.

12. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, and in that the product comprises an initial mixture of reactive monomers which will undergo a polymerization, polyaddition, polycondensation or crosslinking reaction under predetermined temperature and stirring conditions.

13. A product as claimed in claim 12, characterized in that said reaction is a polymerization reaction and the reactive monomers have an unsaturated bond double bond.

14. A product as claimed in claim 12, characterized in that said reaction is a polyaddition or polycondensation reaction.

15. A process intended to prevent crude oil from congealing in a line, in production wells and in petroleum hydrocarbon transportation lines, notably under offshore but also onshore production conditions where the operating temperatures are very low, notably with simple lines or bundles configurations, comprising injecting a gel type product, comprising a controlled-crosslinking thermal insulation gel that is relatively fluid in the beginning, in-situ gelation occuring only under certain temperature and energy supply conditions and pumping conditions in said line, in the fluid state around said line or between said line and an external sheath, and inducing in-situ gelation by modification of the temperature, energy supply and pumping rate conditions, and/or of the conditions of initiation of the crosslinking reaction, in that, the gel type product is prepared by mixing of initial reactive monomers which will undergo a polymerization, polyaddition or crosslinking reaction under predetermined temperature and stirring conditions, and in that step of in-situ gelation comprises carrying out a polymerization reaction of the initial reactive monomers under the effect of a radical initiator, the monomers being selected from the group consisting of alkyl methacrylate monomers, alkyl acrylate monomers, vinyl esters, vinyl chlorides, neopentylglycol dimethacrylate, and divinylbenzene, and the radical initiators peroxides neopentylglycol or diazoic compounds.

16. A process intended to prevent crude oil from congealing in a line, in production wells and in petroleum hydrocarbon transportation lines, notably under offshore but also onshore production conditions where the operating temperatures are very low, notably with simple lines or bundles configurations, comprising injecting a gel type product comprising a controlled-crosslinking thermal insulation gel that is relatively fluid in the beginning, in-situ gelation occuring only under certain temperature and energy supply conditions and pumping conditions in said line, in the fluid state around said line or between said line and an external sheath, and inducing in-situ gelation by modification of the temperature, energy supply and pumping rate conditions, and/or of the conditions of initiation of the crosslinking reaction, in that, the gel type product is prepared by mixing of initial reactive monomers which will undergo a polymerization, polyaddition or crosslinking reaction under predetermined temperature and stirring conditions, and in that the step of in-situ gelation comprises initiating a polyaddition or polycondensation reaction by a temperature increase.

17. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, and in that the product further comprises one or more mineral fillers selected from the group consisting of clays, bentonite, barite, calcium carbonates, and glass microballs.

18. A product intended to prevent petroleum hydrocarbons from congealing in lines, production wells and crude transportation lines, notably under offshore but also onshore production conditions where the operating temperatures are low, notably with simple lines or bundles configurations, characterized in that it comprises a controlled-crosslinking thermal insulation gel that is relatively fluid in the beginning, in-situ gelation occuring only under certain temperature and energy supply conditions and pumping conditions in said line, in that the thermal insulation gel comprises, for the preparation thereof, a gelling agent and at least one base selected from the group consisting of petroleum products, petroleum products with transformation, chemical derivatives of, glycols, water based insulants+ballast, and vegetable oils and synthetic bases, in that it the gelling agent comprises associative polymers that interact in certain solvents and form a thixotropic and pseudoplastic gel, and in that the associative polymers are selected from the group consisting of alkyl resins, acrylic resins and urethane resins.

19. A product as claimed in claim 18, characterized in that the associative polymers comprise alkyd resins resulting from an addition reaction between a polyol and polyacid.

20. A product as claimed in claim 13, characterized in that the monomers are selected from the group consisting of alkyl methacrylate, alkyl acrylate, vinyl esters, vinyl chlorides, neopentylglycol dimethacrylate and divinylbenzene.

21. A product as claimed in claim 20, characterized in that the product further comprises a radical initiator selected from the group consisting of peroxides and diazoic compounds.

22. A product as claimed in claim 17, characterized in that the mineral filler comprises glass microballs having a diameter of 10 to 150 microns.

* * * * *